United States Patent
Grubert et al.

(10) Patent No.: US 7,025,552 B2
(45) Date of Patent: Apr. 11, 2006

(54) ASSEMBLY FOR AUTOMATICALLY COMPENSATING VARIATIONS IN THE SPACING BETWEEN TWO STRUCTURAL MEMBERS

(75) Inventors: Klaus Friedrich Grubert, Bückeburg (DE); Uwe Kirchhecker, Bielefeld (DE); Frank Kassing, Bielefeld (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 10/932,898

(22) Filed: Sep. 2, 2004

(65) Prior Publication Data
US 2005/0053449 A1    Mar. 10, 2005

(30) Foreign Application Priority Data
Sep. 9, 2003    (DE) .......................... 203 14 003 U

(51) Int. Cl.
F16B 43/02    (2006.01)
F16B 39/22    (2006.01)
F16B 2/14    (2006.01)
B25G 3/00    (2006.01)
F16G 11/00    (2006.01)

(52) U.S. Cl. .................... 411/546; 411/301; 411/178; 403/409.1

(58) Field of Classification Search ................ 411/546, 411/383, 384, 535, 432, 433, 183, 367, 368, 411/178, 301–304; 403/409.1
See application file for complete search history.

(56) References Cited

U.S. PATENT DOCUMENTS

| | | | | |
|---|---|---|---|---|
| 2,672,173 A | * | 3/1954 | Chantler | 411/302 |
| 2,725,915 A | * | 12/1955 | Johnson | 411/302 |
| 2,842,180 A | * | 7/1958 | Brown et al. | 411/285 |
| 3,294,139 A | * | 12/1966 | Preziosi | 411/303 |
| 3,308,865 A | * | 3/1967 | Raichelson et al. | 411/302 |
| 3,554,258 A | * | 1/1971 | Duffy | 411/301 |
| 4,043,239 A | * | 8/1977 | DeFusco | 411/337 |
| 4,165,904 A | * | 8/1979 | Reppert | 301/35.631 |
| 4,682,906 A | * | 7/1987 | Ruckert et al. | 403/409.1 |
| 5,288,191 A | * | 2/1994 | Ruckert et al. | 411/432 |
| 5,340,258 A | * | 8/1994 | Simon | 411/535 |
| 5,415,510 A | * | 5/1995 | Funaki et al. | 411/384 |
| 5,618,145 A | * | 4/1997 | Kuo | 411/432 |
| 6,357,953 B1 | * | 3/2002 | Ballantyne | 403/43 |
| 6,361,096 B1 | * | 3/2002 | Kim | 296/35.1 |
| 6,431,602 B1 | * | 8/2002 | Ralko et al. | 280/781 |
| 6,470,612 B1 | * | 10/2002 | Pountney | 40/607.13 |
| 6,585,447 B1 | * | 7/2003 | Schwarzbich | 403/374.3 |
| 6,712,444 B1 | * | 3/2004 | Abe et al. | 347/19 |

(Continued)

FOREIGN PATENT DOCUMENTS

| | | | |
|---|---|---|---|
| DE | 4228625 C1 | * | 3/1994 |
| DE | 3533299 C2 | * | 11/1994 |
| DE | 4314431 A1 | * | 11/1994 |

(Continued)

*Primary Examiner*—Robert J. Sandy
*Assistant Examiner*—Jeffrey A. Sharp
(74) *Attorney, Agent, or Firm*—Seyfarth Shaw LLP

(57) ABSTRACT

An assembly for automatically compensating variations of the spacing between first and second structural members due to manufacturing and/or mounting tolerances. The assembly comprises a mounting bolt, a base element, and an adjustment sleeve. The adjustment sleeve has a drive portion adapted to be engaged with the nut by frictional drag and rotatable relative to said mounting bolt when said frictional drag has been overcome. The drive portion comprises an internal annular plastic portion which projects from the wall of the adjustment sleeve radially outwards sufficiently so as to frictionally engage the threads of the mounting bolt to provide for said frictional drag.

8 Claims, 1 Drawing Sheet

U.S. PATENT DOCUMENTS

| | | | |
|---|---|---|---|
| 6,712,544 B1 * | 3/2004 | Kruger et al. | 403/408.1 |
| 6,736,578 B1 * | 5/2004 | McIninch | 411/352 |
| 6,786,690 B1 * | 9/2004 | Yamada | 411/238 |
| 6,789,993 B1 * | 9/2004 | Ozawa et al. | 411/546 |
| 6,932,044 B1 * | 8/2005 | Fenech | 123/195 C |
| 2003/0077118 A1 * | 4/2003 | Kobusch et al. | 403/408.1 |
| 2003/0077142 A1 * | 4/2003 | Stone et al. | 411/107 |
| 2004/0037670 A1 * | 2/2004 | Rausch et al. | 411/546 |
| 2004/0265090 A1 * | 12/2004 | Stone | 411/338 |
| 2005/0047893 A1 * | 3/2005 | Schwarzbich | 411/546 |

FOREIGN PATENT DOCUMENTS

| | | | |
|---|---|---|---|
| DE | 19651918 A1 * | 4/1997 | |
| DE | 4224575 C2 * | 7/2000 | |
| DE | 199 10 511 A1 | 9/2000 | |
| DE | 19910511 A1 * | 9/2000 | |
| DE | 19949654 A1 * | 4/2001 | |
| DE | 20119112 U1 * | 2/2002 | |
| DE | 201 19 112 U1 | 4/2002 | |
| EP | 534001 A1 * | 3/1993 | |
| EP | 768468 A1 * | 4/1997 | |

* cited by examiner

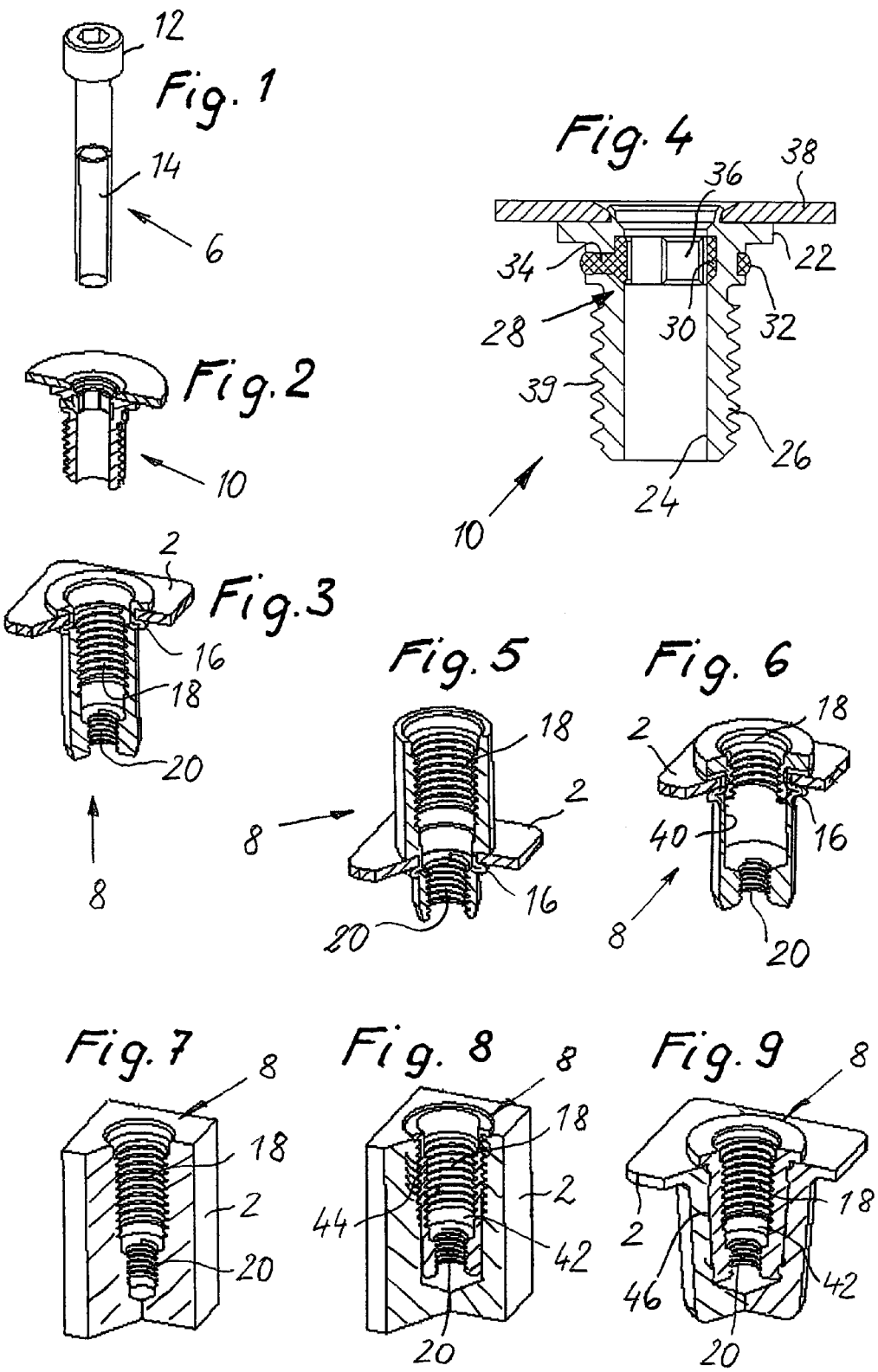

US 7,025,552 B2

ASSEMBLY FOR AUTOMATICALLY COMPENSATING VARIATIONS IN THE SPACING BETWEEN TWO STRUCTURAL MEMBERS

BACKGROUND OF THE INVENTION

This invention relates to an assembly for automatically compensating variations in the spacing between first and second structural members due to manufacturing and/or mounting tolerances.

A vast number of assemblies for compensating variations in the spacing between structural members has become known. There have become known also assemblies which allow for automatic compensation of spacing variations, i.e. without any additional action of an operator, in order not to increase assembly time. Such assemblies are shown for example in DE 100 04 697 A1, EP 0 176 663 A1, and EP 0 848 168 A1. All these assemblies are relatively complex in that they require a relatively large number of components resulting in relatively high manufacturing and mounting costs.

Applicant's DE 101 51 383 A1 discloses an assembly for automatically compensating variations of a spacing between first and second structural members due to manufacturing and/or mounting tolerances, comprising a mounting bolt having external threads, a base element provided at said first structural member and having a threaded bore provided with adjustment threads and mounting threads of different diameters, and an adjustment sleeve having a thru-bore and external threads, said adjustment threads of said base element and said external threads of said adjustment sleeve forming a pair of threads of a predetermined spiral direction to allow adjustment of said adjustment sleeve for compensation purposes, and said mounting threads of said base element and said external threads of said mounting bolt forming a pair of threads of a spiral direction opposite to said first mentioned spiral direction to allow for fixing said assembly, and said adjustment sleeve having a drive portion for providing frictional drag between said adjustment sleeve and said mounting bolt so that rotation of the mounting bolt when inserted into the adjustment sleeve causes rotation of the adjustment sleeve, so that when the adjustment sleeve after compensation of variations has engaged said second structural member and said mounting bolt is rotated further, frictional drag between said mounting bolt and said adjustment sleeve is overcome in order to enable the mounting bolt to be clampingly fixed to said base element.

In this compensation assembly the drive portion of the adjustment sleeve has a clamping portion comprising a plurality of circumferentially spaced resilient finger sections defined by longitudinal slots in an end of the adjustment sleeve. The base element is comprised of a blind rivet nut which is fixed to the associated structural member by an upset bead such that the adjustment threads and the mounting threads of the adjustment sleeve are disposed on the side of the upset bead axially remote from said structural member. This prior compensating assembly is extremely simple as to its structure and mounting expenditure because it is made up of only three relatively simple components. Nevertheless, various improvements of this prior compensation assembly are possible and desirable.

SUMMARY OF THE INVENTION

It is is a general object of the invention to provide an improved assembly for compensating variations in the spacing between first and second structural members due to manufacturing and/or mounting tolerances, which avoids the disadvantages of the prior assemblies while affording additional structural and operational advantages. These improvements are to be provided while maintaining the relatively simple and economical construction of the prior compensating assembly.

According to one aspect of the invention said drive portion of said adjustment sleeve comprising an internal annular plastic portion of said adjustment sleeve, which internal annular plastic portion projects from the wall of the thru-bore of the adjustment sleeve radially inwards sufficiently so as to provide said frictional drag between said drive portion and said external threads of said mounting bolt. Preferably, said adjustment sleeve has an external annular plastic portion projecting beyond said external threads of said adjustment sleeve radially outwards sufficiently so as to allow for frictional or positive engagement between said external annular plastic portion and said base element when said adjustment sleeve is threaded into the base element for securing purposes. Preferably, said internal and external annular plastic portions are interconnected by plastic webs extending through radial bores of said adjustment sleeve. This allows to make the two annual plastic portions by a single injection molding operation.

Preferably, said internal annular plastic portion of said adjustment sleeve has an inner periphery comprising a polygonal surface for manually adjusting said adjustment sleeve.

According to a further aspect of the invention said base element comprising a blind rivet nut having an upset bead for being fixed to said first structural member, said mounting threads being provided on one side of said upset bead and said adjustment threads being provided on the axially opposite side of said upset bead.

As a result, the biasing force provided to fix the compensation assembly is transferred from the mounting bolt via the mounting threads to the base element and is transferred further from the base element directly via the upset bead to the first structural member. This ensures to finalize the rivet setting operation for forming the upset bead which possibly and inadvertently was not completed.

According to a further aspect of the invention said base element being comprised of said first structural member which comprises said adjustment threads and said mounting threads. A separate base element will then not be necessary.

As an alternative said base element comprises a sleeve-shaped insert inserted into said first structural member. According to one embodiment, the sleeve-shaped insert is formed as a threaded insert threadingly engaged into the first structural member. As an alternative said sleeve-shaped insert has a profiled external contour for being embedded into said first structural member which is made of plastic material.

Further developments and modifications of the invention are defined in dependent claims.

BRIEF DESCRIPTION OF THE DRAWINGS

For the purpose of facilitating an understanding of the invention there are illustrated in the accompanying drawings preferred embodiments thereof from an inspection of which, when considered in connection with the following description, the invention, its construction and operation, and many of its advantages should be readily understood and appreciated.

FIG. 1 is a perspective view of a mounting bolt;

FIG. 2 is a perspective sectional view of an adjustment sleeve;

FIG. 3 is a perspective sectional view of a base element formed as a blind rivet nut, along with part of a first structural member;

FIG. 4 is an enlarged sectional view of the adjustment sleeve in FIG. 2;

FIGS. 5 to 9 are views similar to FIG. 3 and showing various embodiments of the adjustment sleeve according to the invention.

DETAILED DESCRIPTION OF PREFERRED EMBODIMENTS

The assembly for automatically compensating variations as shown in the drawings is basically made up of three components, i.e. a mounting bolt 6 (FIG. 1), a base element 8 (FIG. 3), and an adjustment sleeve 10 (FIG. 2). The basic structure of the assembly as shown is similar to that shown in FIGS. 1 to 4 of the above mentioned DE 101 51 383 A1, the disclosure of which is incorporated herein by reference.

The assembly for compensating variations is provided to clamp a plate-shaped first structural member 2 (FIG. 3) and a plate-shaped second structural member (not shown) together and at the same time to compensate variations in the spacing between the two pre-assembled structural members which may be caused by manufacturing and/or mounting tolerances.

The mounting bolt 6 is a conventional bolt such as a standard bolt having a shaft, a head 12, and external threads 14.

The base element 8 as shown in FIG. 3 is a blind rivet nut which is fixed to the structural member 2 by an upset bead 16. The base element 8 has adjustment threads 18 and mounting threads 20 axially offset with respect to each other.

The adjustment sleeve 10 (FIGS. 2 and 4) comprises a sleeve member having a flange 22 at one end, a thru-bore 24, and external threads 26.

The threads 26 of the adjustment sleeve 28 are matingly shaped to the adjustment threads 18 of the base element 8 so as to form (e.g. left-hand) threaded engagement means, while the mounting threads 20 of the adjustment sleeve 8 are matingly shaped to the external threads 14 of the mounting bolt 6 so as to provide oppositely directed (i.e. right-hand) threaded engagement means.

The adjustment sleeve 10, furthermore, has a drive portion 28 adapted to frictionally engage the external threads 14 of the mounting bolt 6 when the mounting bolt 6 has been inserted into the adjustment sleeve 10. The drive portion 28 is of a design such that the mounting bolt 6 may be rotated relative to the adjustment sleeve 28 when the frictional drag has been overcome.

The compensation assembly as described so far is similar to the compensation assembly as shown in FIGS. 1 to 4 of DE 101 51 383 A1. However, it differs therefrom by the structural design of the adjustment sleeve as shown in particular in FIG. 4.

As shown the drive portion 28 comprises an annular internal plastic portion 30 disposed within a matingly shaped annular groove of the sleeve member of the adjustment sleeve 10. The annular plastic portion 30 projects beyond the wall of the thru-bore 24 radially inwards sufficiently so as to be able to perform the desired frictional drive function as will be explained in more detail below.

Furthermore, the adjustment sleeve 10 has an external annular plastic portion 32 which slighly projects radially beyond the outer periphery of the threads 26 as will be explained in more detail below.

The internal annular plastic portion 30 and the external annular plastic portion 32 are interconnected by plastic webs 34 which extend through radial bores within the sleeve member of the adjustment sleeve 28. Due to this interconnection of the two annular plastic portions 30, 32 all the plastic material may be introduced into the adjustment sleeve 10 by a single injection molding operation; the adjustment sleeve 10 may be made from steel.

As shown in FIG. 4, the inner periphery 36 of the annular plastic portion 30 is formed as a polygonal surface which may be engaged by a manually operated tool (not shown). As a result the adjustment sleeve 10 may be rotated also manually as will be explained in more detail below.

Furthermore, a disk member 38 is fixed to the flange 22 of the adjustment sleeve 10 by a riveting or crimping operation such that the disk member 38 can be rotated relative to the remainder of the adjustment sleeve 10. Therefore, when the adjustment sleeve 10 engages the second structural member (not shown), the adjustment sleeve 10 may be rotated while the disk member 38 fixedly engages the second structural member so that the second structural member is prevented from being damaged by burrs or otherwise.

Operation of the described compensation assembly is as follows:

Initially the base element 8 which is a blind rivet nut is fixed to the first structural member 2 by a riveting operation (upset bead 14). The adjustment sleeve 10 will then be threaded into the base element 8 so that its external annular plastic portion 32 will engage the base element 8. Before the adjustment sleeve will be threaded into the base element 8 over its total length, the friction drag between the outer periphery of the plastic portion 32 of the adjustment sleeve 10 and the adjustment threads 18 of the base element 8 will increase so as to exceed the drive torque of the threading tool. Therefore, the threading operation will be terminated before the adjustment sleeve 10 and the base element 8 will be clamped together. At the same time the external annular sleeve portion 32 functions as a securing means so that the structural member 2 along with the base element 8 fixed thereto and the adjustment sleeve 10 threaded thereinto may be handled as a unit without the risk of the adjustment sleeve 10 being released.

Instead of the above described frictional securing means between the adjustment sleeve 10 and the base element 8 a positively acting securing means such as abutments may be provided, which may be combined with a frictional securing means.

When the first structural member 2 and the second structural member (not shown) will have been pre-assembled so as to be spaced from each other, the mounting bolt 6 is inserted through aligned holes of the two structural members into the thru-bore 24 of the adjustment sleeve 10 until the external threads 14 of the mounting bolt 6 will engage the internal annular plastic portion 30 of the adjustment sleeve 10. When the mounting bolt 6 is rotated by means of a torque wrench (not shown), the adjustment sleeve 10 will be co-rotated due to the frictional drag between the plastic portion 30 and the external threads 14 of the mounting bolt 6. Because the threads 26 of the adjustment sleeve 10 and the threads 18 of the base element 8 are left-hand threads (i.e. of a spiral direction opposite to the right-hand threads of the mounting bolt 6), the adjustment sleeve 10 is rotated by the mounting bolt 6 so as to move opposite to the "insertion direction" from the base element 8 until the adjustment sleeve 10 along with the disk member 38 will engage the underside of the second structural member (not shown) so as to compensate for any variations in the spacing between the two structural members.

When the adjustment sleeve 10 will have engaged the second structural member, it cannot be displaced anymore in an axial direction; as a result the mounting bolt 6 cannot be rotated any further. Therefore, the mounting bolt 6, when the frictional drag between the plastic portion 30 of the adjustment sleeve 10 and the external threads 14 of the mounting bolt 6 will have been overcome, may be brought into engagement with the threads 20 of the base element 8. When the head 12 of the mounting bolt 6 will have engaged the second structural member (not shown), the mounting bolt 6 may be driven by the torque necessary to clamp the two structural members together while the predetermined spacing therebetween is maintained.

As already mentioned the inner periphery of the internal annular plastic portion 30 of the adjustment sleeve 10 is formed as a polygonal surface 36. Therefore, as an alternative to the described automatic compensation operation, the adjustment sleeve 10 may be manually adjusted by a torque wrench engaging the polygonal surface 36. In this case, in order to prevent the adjustment sleeve 10 from being rotated inadvertently, the threads of the adjustment sleeve 10 may be provided with chemical or mechanical securing means 39. The chemical securing means may comprise for example a microcapsule adhesive, a melted plastic element, polyamid spots or the like. Since such securing means are well known in the art, they will not be described any further.

Due to the simple structure of the described compensation assembly, the mounting bolt 6 and the adjustment sleeve 10 may be associated with a wide variety of different embodiments of the base element 8; therefore, the compensating assembly may be considered to be some kind of a module. FIGS. 5 to 9 show various embodiments of the base element 8 which may be used instead of the base element 8 shown in FIG. 3.

In the embodiment of FIG. 3 the base element 8 is of a structure such that the adjustment threads 18 and the mounting threads 20 both are disposed on the side of the upset bead axially remote from the structural member 2 (i.e. below the structural member 2). In contrast thereto, the base element of FIG. 5 is of a structure such that the adjustment threads 18 and the mounting threads 20 are disposed on axially opposite sides of the upset bead 16; i.e. the adjustment threads 18 are situated above the structural member 2. An advantage of this structure of the base element 8 is that when torque is exerted upon the mounting bolt 6 the drive force is transferred via the threads 14, 20 directly upon the upset bead 16 and from there to the structural member 2. Therefore, if the forming of the upset bead 16 during the setting operation was not fully completed, the setting operation will be completed by the clamping of the compensating assembly by means of the mounting bolt 6.

Since in the embodiment of FIG. 5 the adjustment threads which are disposed above the structural member 2 are of a similar axial length as the threads 26 of the adjustment sleeve 10, the base element 8 will have a relatively large height above the structural member 2. When the spacing between the first structural member 2 and the second structural member (not shown) is not sufficient to accommodate this height, the base element may be of a structure as shown in FIG. 6.

In the embodiment of FIG. 6 where the base element 8 is formed again as a blind rivet nut, the adjustment threads 18 are associated to the upset bead 16 such that while they are above the upset bead 16 they extend through the plane of the plate-shaped structural member 2. Furthermore, the adjustment threads 18 are of an axial length less than that of the embodiments in FIGS. 3 and 5. In order to enable the adjustment sleeve 10 to be threaded into the base element 8 for a sufficient length the base element 8 has an undercut 40 below the adjustment ribs 18 to receive the threads 26 of the adjustment sleeve 10. Due to this structure the base element has a much smaller height above the structural member 2 than the base element 8 of FIG. 5 while it retains the advantage of the adjustment threads 18 being disposed on the side of the upset bead 16 remote from the mounting threads 20. Therefore, the drive force for rotating the mounting bolt 6 will be transferred via the upset bead 16 directly upon the structural member 2 also in this embodiment.

In the embodiment shown in FIG. 7 there is no separate base element. Rather, the base element 8 is comprised of the structural member 2. In other words, the adjustment threads 18 and the mounting threads 20 are formed directly in the structural member 2 which may be e.g. an aluminum block.

As a further alternative the base element 8 may be formed as a sleeve-shaped insert for being inserted into the block-shaped structural member 2 as shown in FIGS. 8 and 9.

In the embodiment of FIG. 8 the insert 42 is a threaded insert having external threads 44 threaded into the structural member. To this end, the structural member 2 may be provided with a matingly shaped threaded bore. As an alternative the threads 44 of the sleeve-shaped insert 42 may be formed as self-tapping threads which may be threaded along with the base element 8 into a structural member 2 of wood, plastic material or metal, or into a structural member provided with a dowel system.

In the embodiment of FIG. 9 the insert 42 along with the adjustment threads 18 and the mounting thread 20 are of a profiled, e.g. stepped external contour 46 for retaining the insert 42 within the structural member 2. For example, the insert 42 may be embedded into a structural member 2 of plastic material by a melting operation or the like.

Since threaded inserts similar to FIG. 8 and embedded inserts similar to FIG. 9 are known in the art, they will not be described any further.

In the embodiment described in connection with FIG. 4 the frictional drag between the mounting bolt 6 and the adjustment sleeve 10 is provided by the internal annular plastic portion 30 of the drive portion 28. As an alternative, the mounting bolt 6 may be provided in the area of its threads 14 with a plastic coating frictionally engaging the wall of the thru-bore 24 of the adjustment sleeve 10 so as to rotate the adjustment sleeve 10 when the mounting bolt 6 is threaded into the thru-bore 24. The plastic coating may be provided over the total length of the threads 14 or only over part of the length of the threads 14 of the mounting bolt 6. Furthermore, the plastic coating on the threads 14 of the mounting bolt 6 may be positioned such that it serves also as securing means for securing the mounting bolt 6 within the mounting threads 20 of the base element 8.

We claim:

1. An assembly for automatically compensating variations of a spacing between first and second structural members due to manufacturing and/or mounting tolerances, comprising:

a mounting bolt having external threads, a base element provided at said first structural member and having a threaded bore provided with adjustment threads and mounting threads of different diameters, and an adjustment sleeve of metal and having a thru-bore and external threads, said adjustment threads of said base element and said external threads of said adjustment sleeve forming a pair of threads of a predetermined spiral direction to allow for adjustment of said adjustment sleeve for compensation purposes, and said mounting threads of said base element and said external threads of said mounting bolt forming a pair of treads of a spiral direction opposite to said first mentioned spiral direction to allow for fixing said assembly, and said adjustment sleeve having a drive portion for providing frictional drag between said adjustment sleeve and said mounting bolt so that rotation of the mounting bolt when inserted into the adjustment sleeve causes rotation of the adjustment sleeve, so that when the adjustment sleeve after compensation of variations has engaged said second structural member and said mounting bolt is rotated further, frictional drag between said mounting bolt and said adjustment sleeve is overcome in order to enable the mounting bolt to be clampingly fixed to said base element, said drive portion of said adjustment sleeve comprising an internal annular plastic portion, which internal annular plastic portion is disposed in an annular groove of the adjustment sleeve and projects from the wall of the thru-bore of the adjustment sleeve radially inwards sufficiently so as to provide said frictional drag between said drive portion and said external threads of said mounting bolts, wherein said adjustment sleeve has an external annular plastic portion projecting beyond said external threads of said adjustment sleeve radially outwards sufficiently so as to allow for frictional or positive engagement between said external annular plastic portion and said base element when said adjustment sleeve is threaded into the base element for securing purposes, and wherein said intern and external annular plastic portions are interconnected by plastic webs extending through radial bores of said adjustment sleeve.

2. The assembly of claim 1, wherein said internal and external plastic portions and said plastic webs are made by injection molding.

3. The assembly of claim 1, wherein said adjustment sleeve has a head portion comprising a disk member serving as an abutment and adapted to be rotated relative to the remainder of the adjustment sleeve.

4. The assembly of claim 1, wherein said internal annular plastic portion of said adjustment sleeve has an inner periphery comprising a polygonal surface for manually adjusting said adjustment sleeve.

5. The assembly of claim 4, wherein said adjustment sleeve when manually adjusted is adapted to be fixed by chemical or mechanical securing means.

6. The assembly of claim 1,
wherein said base element comprises a blind rivet nut having an upset bead for being fixed to said first structural member, said mounting threads being provided on one side of said upset bead and said adjustment threads being provided on the axially opposite side of said upset bead.

7. The assembly of claim 6, wherein said adjustment threads of said base element altogether are disposed on a side of said first structural member remote from said upset bead.

8. The assembly of claim 6, wherein said adjustment threads of said base element extend at least partially trough a plane of said first structural member and said base element is provided wit an undercut in the area between said adjustment threads and said mounting threads to receive a projecting part of said external threads of said adjustment sleeve threaded into said base element.

* * * * *